(12) United States Patent
Hagihara et al.

(10) Patent No.: US 8,575,512 B2
(45) Date of Patent: Nov. 5, 2013

(54) LASER LAP WELDING METHOD FOR GALVANIZED STEEL SHEET

(75) Inventors: Tsukasa Hagihara, Hamamatsu (JP); Takayoshi Dan, Hamamatsu (JP)

(73) Assignee: Suzuki Motor Corporation (JP)

(*) Notice: Subject to any disclaimer, the term of this patent is extended or adjusted under 35 U.S.C. 154(b) by 263 days.

(21) Appl. No.: 13/093,907

(22) Filed: Apr. 26, 2011

(65) Prior Publication Data
US 2011/0266263 A1    Nov. 3, 2011

(30) Foreign Application Priority Data
Apr. 28, 2010    (JP) .................................. 2010-102901

(51) Int. Cl.
B23K 26/24    (2006.01)
B23K 26/28    (2006.01)

(52) U.S. Cl.
USPC .................................. 219/121.64; 219/121.61

(58) Field of Classification Search
USPC .............. 219/121, 64, 121.8, 121.61, 121.62, 219/121.63
See application file for complete search history.

(56) References Cited

U.S. PATENT DOCUMENTS

| | | | |
|---|---|---|---|
| 4,000,392 A | 12/1976 | Banas et al. | |
| 4,682,002 A | 7/1987 | Delle Piane et al. | |
| 5,183,992 A | 2/1993 | Bilge et al. | |
| 5,595,670 A | 1/1997 | Mombo-Caristan | |
| 6,770,841 B2 * | 8/2004 | Briand et al. | 219/121.64 |
| 7,091,444 B2 * | 8/2006 | Becker et al. | 219/121.64 |
| 2004/0118819 A1 | 6/2004 | Danzer | |
| 2007/0084835 A1 * | 4/2007 | Dinauer et al. | 219/121.64 |
| 2008/0210672 A1 * | 9/2008 | Meyer et al. | 219/121.64 |
| 2009/0050608 A1 | 2/2009 | Hayashi et al. | |
| 2009/0266801 A1 * | 10/2009 | Oku et al. | 219/121.64 |
| 2011/0095002 A1 * | 4/2011 | Katayama et al. | 219/121.64 |
| 2011/0139753 A1 * | 6/2011 | Lee et al. | 219/121.64 |

FOREIGN PATENT DOCUMENTS

| | | |
|---|---|---|
| CN | 101043968 A | 9/2007 |
| DE | 101 24 345 A1 | 11/2002 |
| JP | 60-210386 | 10/1985 |
| JP | 61-74793 | 4/1986 |
| JP | 2002-160082 | 6/2002 |

(Continued)

OTHER PUBLICATIONS

International Search Report corresponding to International Application No. PCT/JP2009/062443 mailed Oct. 13, 2009.

(Continued)

Primary Examiner — Geoffrey S Evans
(74) Attorney, Agent, or Firm — Myers Bigel Sibley & Sajovec, P.A.

(57) ABSTRACT

Provided is a laser lap welding method including the steps of: preparing two steel sheets, at least one of which is a galvanized steel sheet, in such a manner that the steel sheets are directly lapped one over the other with a galvanized layer of the galvanized steel sheet located as an interface of the steel sheets; and irradiating an outer surface of any one steel sheet in the lap region of the two steel sheets with a laser beam under predetermined power and speed conditions, so that an elongated hole is formed in a molten pool extending backward from a laser irradiation position at least in the steel sheet on the outer surface side. Welding of the two steel sheets is performed while venting metal vapor produced by the laser irradiation through the elongated hole backwards in a laser travelling direction and towards a laser irradiation source.

1 Claim, 4 Drawing Sheets

(56) References Cited

FOREIGN PATENT DOCUMENTS

| | | |
|---|---|---|
| JP | 2002-331375 | 11/2002 |
| JP | 2003-053544 A | 2/2003 |
| JP | 2003-094185 | 4/2003 |
| JP | 2005-144504 | 6/2005 |
| JP | 2005-262226 | 9/2005 |
| JP | 2006-000924 | 1/2006 |
| JP | 2007-038269 | 2/2007 |
| JP | 2008-049362 | 3/2008 |
| WO | WO 2006/046608 A1 | 5/2006 |
| WO | WO 2010/005025 A1 | 1/2010 |

OTHER PUBLICATIONS

Office Action corresponding to German Application No. 11 2009 001 685.5 dated Jun. 5, 2012.

First Chinese Office Action corresponding to Chinese Application No. 200980126515.3 issued Mar. 25, 2013.

* cited by examiner

LASER LAP WELDING METHOD FOR GALVANIZED STEEL SHEET

CROSS-RELATED APPLICATIONS

This application claims priority from Japanese Patent Application No. 2010-102901; filed Apr. 28, 2010, the disclosure of which is incorporated herein by reference in its entirety.

BACKGROUND OF THE INVENTION

The present invention relates to a laser lap welding method for a galvanized steel sheet. More specifically, the present invention relates to a method for processing an end portion of a welding section in a laser welding method for galvanized steel sheets lapped one over the other with no gap.

In a wide variety of industries such as the automobile industry, galvanized steel sheets are commonly used because they are high in specific strength and low in cost as well as excellent in corrosion resistance. In particular, in the automobile industry, etc., where steel sheets having large areas are used, there have been attempts to introduce laser beam welding capable of higher speed processing than spot welding and the like in order to weld together a number of galvanized steel sheets lapped one over another.

However, the melting point (approximately 420° C.) and boiling point (907° C.) of zinc are much lower than the melting point (approximately 1535° C.) of iron. Accordingly, merely lapping galvanized steel sheets followed by laser irradiation results in the formation of weld defects such as pits, porosities, and worm holes due to a phenomenon in which zinc evaporated from each galvanized layer blows away molten metal therearound or remains in the molten metal as bubbles. For this reason, as described in JP 60-210386 A, JP 61-74793 A, or JP2007-38269A, countermeasures have been developed such as providing a gap for venting zinc vapor between galvanized steel sheets to be welded together by laser lap welding, using a spacer, a difference in level, or the like. However, such a method requires much time and effort, impairing the merits of introducing laser beam welding.

Then, WO 2010/005025 A1 discloses a laser lap welding method in which a laser beam is emitted with higher power density and at higher speed than usual to thereby temporarily form an elongated hole 20 (keyhole) in a molten pool 2 behind a laser irradiation position (10) as shown in FIGS. 1(a) and 1(b), and welding (3) is performed while venting metal vapor 23 through the hole 20 toward a laser irradiation source. This method eliminates the need for an additional preparing process as described above, and enables laser beam welding immediately after galvanized steel sheets are directly lapped one over the other. Thus, a large number of galvanized steel sheets having large areas can be efficiently welded together.

SUMMARY OF THE INVENTION

On the other hand, due to the feature that metal vapor is vented through the elongated keyhole, the above method also has other problems. Specifically, as shown in FIGS. 2(a) and 2(b), a trace 30 of the elongated hole (20) remains at a terminal end portion 32 of the welding section 3, while a swell 33 of molten metal is created at the starting end portion 31 of the welding section 3 because a plume (23) blows out in a direction opposite to a welding direction F. The trace at the welding spot is observed in welding methods other than the laser beam welding. Hence, welding is performed at portions other than a design surface, or the trace is covered with another component. Regardless of such an appearance problem, such a hole trace (30) is unacceptable in many cases in automotive components and the like due to problems in functions such as liquid tightness and air tightness. Moreover, the swell (33) at the welding area is also unacceptable in many cases due to a problem in matching with, for example, assembling components mounted thereon.

Such a trace as described above is not formed at the end portion of the welding section when laser irradiation is started from one end portion of lapped galvanized steel sheets and is terminated after passing another end portion thereof. However, it is not a rare case that at least one of a starting end and a terminal end of the welding section is set within a lap region of galvanized steel sheets. In a method for conventional general laser beam welding, laser output is faded down at a terminal end portion of a welding section. In a laser beam welding method in which galvanized steel sheets are directly lapped one over the other, however, the welding conditions such as the foregoing power density and speed cannot be maintained during the process of fading down the laser output as shown in FIG. 3, and weld defects are formed due to metal vapor. For this reason, this method is not directly applicable.

The present invention has been made in view of the aforementioned circumstances, and an object of the invention is to provide a laser lap welding method for a galvanized steel sheet which requires no additional process for avoiding welding defects due to zinc vapor, and is capable of high speed and high quality weldbonding with galvanized steel sheets being in intimate contact with one another while avoiding a swell at a starting end portion of a welding section and a hole trace at a terminal end portion thereof.

In order to achieve the above object, a laser lap welding method for a galvanized steel sheet according to the present invention includes the steps of: preparing two steel sheets (11, 12), at least one of which is a galvanized steel sheet, in such a manner that the steel sheets are directly lapped one over the other with a galvanized layer of the galvanized steel sheet located as an interface of the steel sheets; and irradiating an outer surface of any one steel sheet in the lap region of the two steel sheets with a laser beam under predetermined power and speed conditions, so that an elongated hole (20) is formed in a molten pool (2) extending backward from a laser irradiation position (10) at least in the steel sheet on the outer surface side, whereby welding of the two steel sheets is performed while venting metal vapor produced by the laser irradiation through the elongated hole (20) backwards in a laser travelling direction and towards a laser irradiation source, wherein at a starting end portion (131, 231, 331) of a welding section (103, 203, 303) in the direct lap region, welding of any one of the welding section (103) and another welding section (204, 304) is terminated (at 132, 242, 342) with the conditions to form the elongated hole maintained.

According to the laser lap welding method for galvanized steel sheet of the present invention, no additional process for avoiding weld defects due to zinc vapor is necessary. High speed and high quality weldbonding is performed with the galvanized steel sheets being directly in intimate contact with one another. Metal shortage at a terminal end portion of a welding section is compensated by an extra amount of molten metal built up at a starting end portion of the welding section. Furthermore, a hole trace at the terminal end portion of the welding section can be avoided.

DETAILED DESCRIPTION OF THE INVENTION

The present invention now will be described more fully hereinafter in which embodiments of the invention are provided with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs.

Figure 1A:
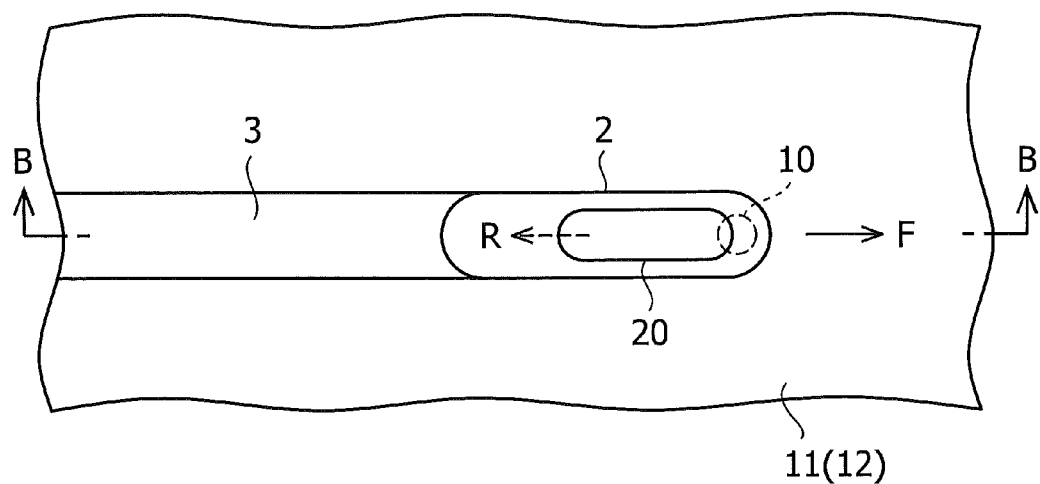
FIG. 1(a) is a plan view conceptually showing laser lap welding for a galvanized steel sheet.
Figure 1B:
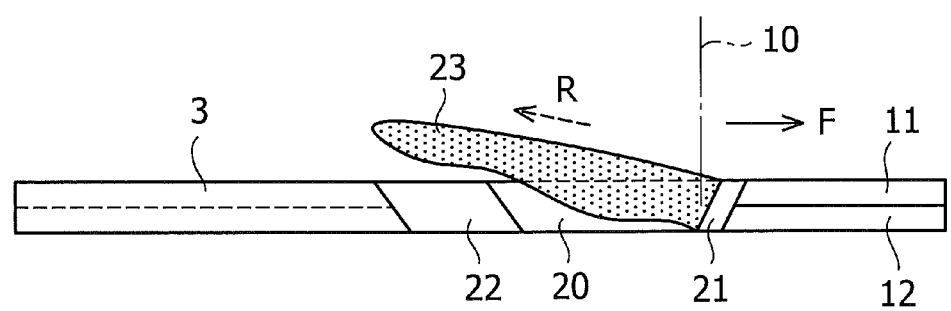
FIG. 1(b) is a B-B cross-sectional view thereof.

A laser lap welding method for a galvanized steel sheet, which is a premise of the present invention is performed as shown in FIGS. 1(a) and 1(b) with two galvanized steel sheets 11 and 12 being lapped one over the other with no gap. With respect to the thicknesses of these galvanized steel sheets 11 and 12, a laser beam having a significantly higher power (for example, 7 kW or more for a galvanized steel sheet having a thickness of 0.7 mm) than that of generally-adopted laser lap welding is irradiated while the laser beam travels at a significantly higher speed (for example, 9 m/min or more for a galvanized steel sheet having a thickness of 0.7 mm) than general travelling speed.

With laser welding, bonding is provided by solidification of molten metal which is fused by being heated and melted by laser irradiation energy. Thus, merely increasing a movement speed of laser irradiation results in shortage of power to be supplied per unit time, which causes poor welding. On the other hand, if a power density is too high, a melted portion cannot be fused and will burn out.

However, when laser irradiation is performed with high power and high speed, and when the power per volume in unit time, i.e., power density, is within a predetermined range as described later, an elongated keyhole 20 is formed in a molten pool 2 behind a laser irradiation position (10). The evaporation of metal concentrates on the front end side of the elongated keyhole 20 in a traveling direction F of laser irradiation. Metal vapor 23 (laser-induced plume) is vented backward R from the front end of the keyhole 20 along the traveling direction of laser irradiation toward a laser irradiation source side, so that the keyhole 20 is made elongated. Furthermore, zinc vapor is vented from or near the front end of the elongated hole 20 thus formed, so that the zinc vapor does not blow away molten metal in the molten pool 2 and the molten metal does not remain in the molten pool 2.

In order to perform favorable laser welding with the galvanized steel sheets 11 and 12 being lapped one over the other with no gap, in case of, for example, a thin steel sheet, it is preferable to select a travelling speed v (mm/sec) such that a power per volume in unit time "P/øtv" of a laser beam is 0.07 to 0.11 (kW·sec/mm³) with a laser beam having a power "P" of not less than 7 (kW) and a laser irradiation spot diameter "ø" of not less than 0.4 (mm) when a galvanized steel sheet has a thickness "t" (mm).

The matter that a power per volume in unit time P/øtv of the laser beam is within the foregoing range represents that the power P of the laser beam to be radiated is determined according to an irradiation width (irradiation spot diameter) ø, a sheet thickness t, and a travelling speed v (a movement distance per unit time of the irradiation spot). This was approximately and empirically determined from an applicable sheet thickness of a galvanized steel sheet to be subjected to laser lap welding. Assuming that there is a region having a uniform shape in the laser travelling direction and a cross-section shape thereof is an inverted triangle in which the height thereof (interpenetrated depth) is 2t (a thickness of two sheets), it is thought that the "øtv" is determined by multiplying the cross-sectional area (ø×2t/2) of the triangle by the travelling speed v. If two galvanized steel sheets to be lap-welded are different in sheet thickness t, the sheet thickness t of the galvanized metal sheet disposed on the laser irradiation source side is used as a reference. When three or more galvanized steel sheets are lap-welded, half of a total sheet thickness should be applied.

Note that a laser oscillator used for welding, a processing head for laser scanning, and the like are not particularly limited, and known laser welding devices can be used. However, since it is necessary to move a high output laser beam at high speed as described above, a preferable laser welding device is one including a galvano scan-type processing head composed of a pair of galvano mirrors and an fθ lens.

Next, the laser lap welding method for a galvanized steel sheet according to the present invention (method for processing an end portion of a welding section) will be described.

First Embodiment

Figure 2A:
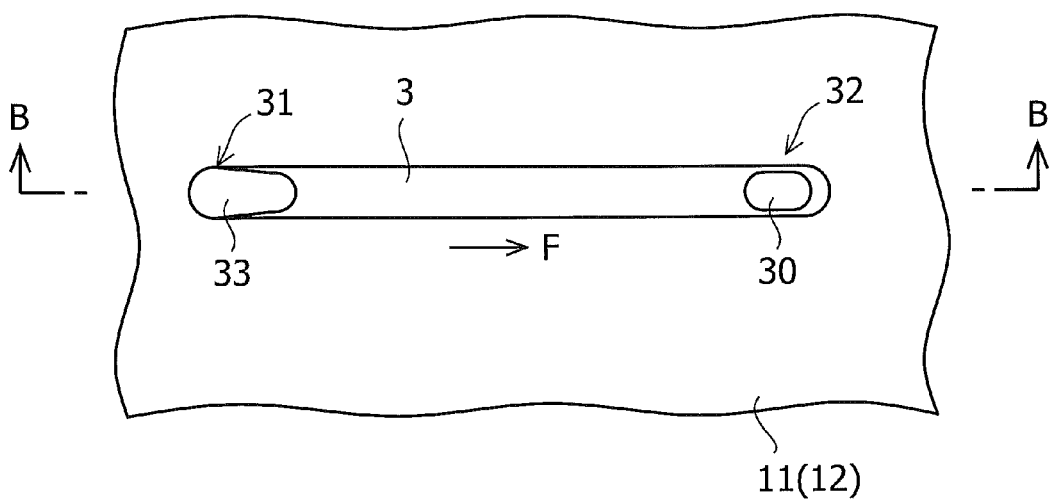
FIG. 2(a) is a plan view conceptually showing a laser lap welding section of galvanized steel sheets.
Figure 2B:
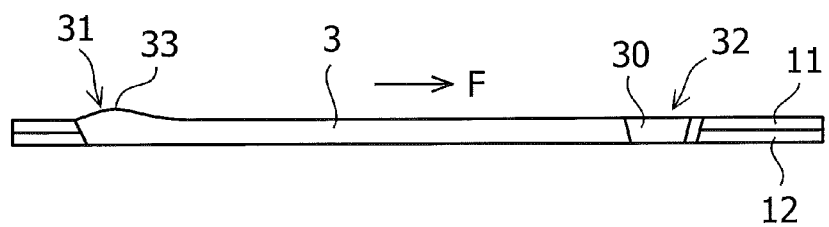
FIG. 2(b) is a B-B cross-sectional view thereof.
Figure 3:
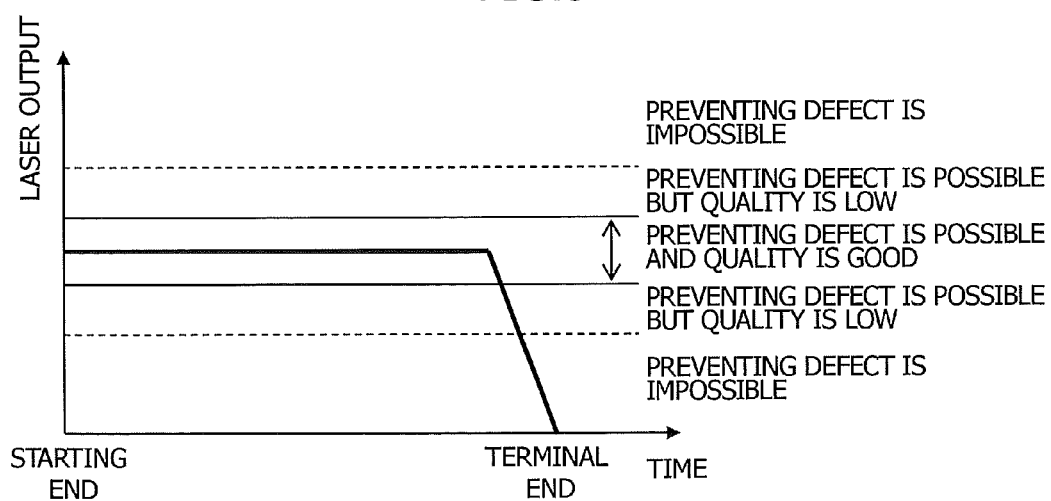
FIG. 3 is a graph showing a relationship between a laser output and a defect in the laser lap welding for a galvanized steel sheet.

As has been described above, in laser lap welding in which laser irradiation is performed with high power and high speed with the galvanized steel sheets 11 and 12 being lapped one over the other with no gap, metal vapor is vented through an elongated keyhole, and thereby weld defects due to zinc vapor can be avoided. On the other hand, when a starting end or a terminal end of a welding section is set within a region where galvanized steel sheets are lapped one over the other, as shown in FIGS. 2(a) and 2(b), a trace 30 of the elongated hole (20) remains at a terminal end portion 32 of the welding section 3 while the plume (23) blows out in the direction opposite to the welding direction F at a starting end portion 31 of the welding section 3, creating a swell 33 of molten metal.

Figure 4:
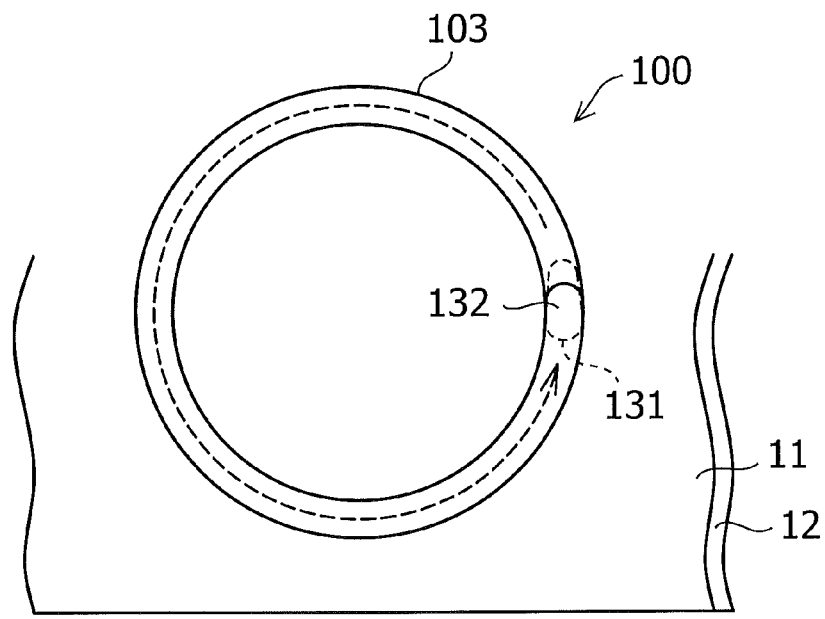
FIG. 4 is a plan view conceptually showing a welding section by a laser lap welding method for a galvanized steel sheet according to a first embodiment of the present invention.

Thus, on a welding area 100 in a first embodiment shown in FIG. 4, laser irradiation with predetermined high power and high speed is started from a starting end portion 131 of a welding section 103 located within a region where the galvanized steel sheets 11 and 12 are directly lapped one over the other. The laser irradiation is performed circularly (along a closed curve) as indicated by a broken arrow. While the welding conditions are being maintained, the laser irradiation is terminated at the starting end portion 131 of the welding section 103. In other words, a terminal end portion 132 of the welding section 103 overlaps the starting end portion 131 of the welding section 103.

Thereby, metal shortage that occurs in the hole trace 30 at the terminal end portion 32 of the welding section shown in FIGS. 2(*a*) and 2(*b*) is compensated by an extra amount of metal of the swell 33 at the starting end portion 31 of the welding section. Thus, neither the hole trace 30 nor the swell 33 remains at the connection portion (131, 132) of the welding section 103 having a shape of such a closed curve. Otherwise, at least the bulging trend or the recessing trend is dramatically reduced. In other words, although the welding conditions of high power and high speed are maintained until the terminal end portion 132, it can also be understood in the following way that the conditions required to form the elongated keyhole 20 are increased at a small section by the amount of the swell 33 having existed at the starting end portion 131 of the welding section; consequently, fading down is achieved (relatively).

The metal shortage in the hole trace 30 at the terminal end portion 32 of the welding section has a correlation with the extra amount of metal of the swell 33 at the starting end portion 31 of the welding section. Thus, the method of this embodiment can be performed similarly in case in which the galvanized steel sheets 11 and 12 have different thicknesses or other welding conditions are different.

Second Embodiment

Figure 5:
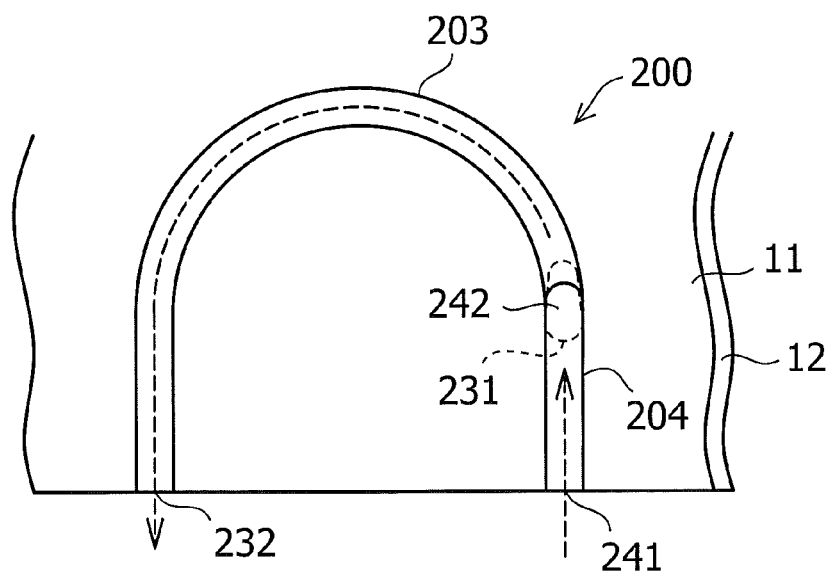
FIG. 5 is a plan view conceptually showing a welding section by a laser lap welding method for a galvanized steel sheet according to a second embodiment of the present invention.

On a welding area 200 in a second embodiment shown in FIG. 5, first laser irradiation is started, for example, from a first starting end portion 231 located within a region where the galvanized steel sheets 11 and 12 are directly lapped one over the other. A first welding section 203 is laser welded. While the welding conditions are being maintained, the first laser irradiation is continuously performed on an end portion 232 of the lap region of the galvanized steel sheets 11 and 12 and terminated outside the lap region. Then, second laser irradiation is started, for example, from the outside of another end portion 241 of the lap region of the galvanized steel sheets 11 and 12. A second welding section 204 is laser welded. The second laser irradiation is terminated at the starting end portion 231 of the first welding section 203. In other words, a terminal end portion 242 of the second welding section 204 overlaps the starting end portion 231 of the first welding section 203, which is different therefrom.

In this case also, as similarly to the first embodiment, metal shortage at the terminal end portion (242) of the welding section is compensated by an extra amount of metal at the starting end portion (231) of the welding section. Thus, neither a hole trace nor a swell remains at such a connection portion (231, 242) of the first or second welding section 203 or 204. Otherwise, at least the bulging trend or the recessing trend is dramatically reduced.

Third Embodiment

Figure 6:
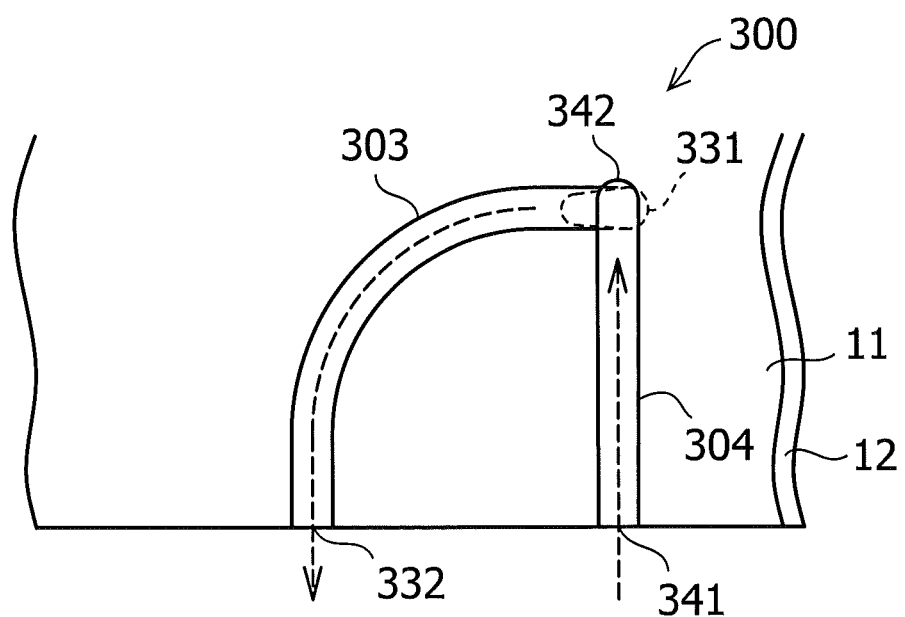
FIG. 6 is a plan view conceptually showing a welding section by a laser lap welding method for a galvanized steel sheet according to a third embodiment of the present invention.

In any of the welding areas 100 and 200 respectively described in the first and second embodiments, illustrated is the case in which the terminal end portion (132, 242) of the welding section (103, 204) overlaps the starting end portion (131, 231) of the welding section (103, 203) in the same direction. Nevertheless, the terminal end portion may overlap the staring end portion from another direction. For example, in a welding area 300 in a third embodiment shown in FIG. 6 (modified example of the second embodiment), the laser irradiation is terminated with a terminal end portion 342 of a second welding section 304 perpendicularly overlapping a starting end portion 331 of a first welding section 303 irradiated with the laser in advance. The other configurations are the same as those of the second embodiment.

Any direction can be set for overlapping the terminal end portion with the starting end portion, and the overlap can be performed at any angle other than the same direction (0°) and the perpendicular direction (90°). The overlap can also be performed in an opposite direction (180°) with respect to the starting end portion. Additionally, in the welding section 100 having a shape of the closed curve as in the first embodiment, the terminal end portion (132) can overlap the starting end portion 131 in any direction.

Furthermore, in completing the laser irradiation on the welding section (103, 204, 304) where the terminal end portion (132, 242, 342) overlaps the starting end portion (131, 231, 331), it is possible to fade down the laser output in the already-welded portion of the region (103, 203, 303).

Examples

After that, to verify the effect of processing the end portions of the welding section in the laser lap welding method for a galvanized steel sheet according to the present invention, the overlapping amount of the starting point and the terminal point at the position of the terminal end portion 132 relative to the starting end portion 131, i.e., on the control coordinates of laser scanning, was intentionally changed in the laser welding of the welding area 100 in the first embodiment. The comparison experiment was conducted as follows.

In the experiment, a fiber laser oscillator manufactured by IPG Photonics Corporation (a maximum output 7 kW and a transmission fiber diameter ø=0.2 mm) and a scanner head (just focused processing diameter ø=0.6 mm) were used. Galvanized steel sheets with a thickness of t=0.7 mm were lapped one over the other with no gap so that each galvanized layer was an interface therebetween. Laser irradiation was performed with a spot diameter of ø=0.67 mm, a laser output of 7 kW, a power density of 19.9 kW/mm$^2$, and a travelling speed of 11 in/min. The condition of welding and the condition of the terminal end portion (connection portion) of the welding section were examined for each overlapping amount of the starting end portion and the terminal end portion:

(a) 2.5 mm (optimum value);
(b) 0 mm (no overlap); and
(c) 4.4 mm (excessive overlap, i.e., overrun).

Moreover, as a comparative example (d), laser irradiation was performed with an overlapping amount of 0 mm under the welding condition to form no elongated keyhole: a laser output of 4.5 kW, a power density of 12.8 (kW/mm$^2$), and a travelling speed of 8 (m/min). Comparison was made with each case of the above overlapping amounts. The results of each case and the comparative example were as follows.

(1) Condition of Welding

In any case of (a) to (c) above, an elongated hole (keyhole) having a length of approximately 1.5 mm was observed behind the welding spot during the welding; in addition, no weld defects were observed in an intermediate portion of the welding section (bead). Meanwhile, in (d) above, no hole was observed behind the welding spot during the welding; in addition, nine weld defects (blow holes) were observed on the front surface side of the welding section (bead), and four weld defects were observed on the back surface side thereof.

(2) Condition of Terminal End Portion (Connection Portion) of Welding Section

In the case of the (a) overlapping amount of 2.5 mm (optimum value), a swell was observed at the starting end portion immediately after the welding was started. Nevertheless, by overlapping the terminal end with the starting end portion 131 by an appropriate length, no hole trace such as a recessed portion was observed at the terminal end portion (connection portion) after the completion of the welding. It was confirmed that metal shortage at the terminal end portion of the welding section was compensated by an extra amount of metal of the swell at the starting end portion of the welding section.

Meanwhile, in the case of the (b) overlapping amount of 0 mm (no overlap), a swell remained at the starting end portion of the welding section, and a hole trace remained at the terminal end portion of the welding section adjacent to and immediately in front of the starting end portion.

Moreover, in the case of the (c) overlapping amount of 4.4 mm (overrun), most of a swell at the starting end portion of the welding section was eliminated, but a hole trace remained at the terminal end portion of the welding section adjacent to the starting end portion.

Note that in (d) above, although the welding was terminated without overlapping, no swell was formed at the starting end portion and no hole trace was formed at the terminal end portion. However, as described above, a number of defects were formed on the front and back sides of the welding section (bead), and the state of the overall welding section was a problem to be solved before the problem of the terminal end portion (connection portion) and thus was not at an acceptable level.

For example, in the first embodiment, illustrated was the case in which the welding area 100 is formed of the single circular welding section 103. The welding area 100 nevertheless may have another shape of closed curve such as ellipse or water droplet. Moreover, such a welding section 103 may be saved as a welding unit in a controller of a laser welding device so that the welding unit can be realized only by designating the reference position such as the center of a circle. Further, it is possible to set a flange around an opening of galvanized steel sheets lapped one over the other, or the welding section 103 that turns along an attachment portion of an article, or the like.

Having thus described certain embodiments of the present invention, it is to be understood that the invention defined by the appended claims is not to be limited by particular details set forth in the above description as many apparent variations thereof are possible without departing from the spirit or scope thereof as hereinafter claimed. The following claims are provided to ensure that the present application meets all statutory requirements as a priority application in all jurisdictions and shall not be construed as setting forth the full scope of the present invention.

What is claimed is:

1. A laser lap welding method for a galvanized steel sheet, comprising the steps of:
preparing two steel sheets, at least one of which is a galvanized steel sheet, in such a manner that the steel sheets are directly lapped one over the other with a galvanized layer of the galvanized steel sheet located as an interface of the steel sheets; and
irradiating a laser along one or more welding sections on an outer surface of any one steel sheet in the lap region of the two steel sheets under predetermined conditions, in which the laser traveling speed (v) mm/sec leads to a power per volume in unit time (P/øtv) of the laser beam within a range from 0.07 to 0.11 kWsec/mm$^3$ when the laser beam has a power (P) which is not less than 7 kW and an irradiation spot diameter (ø) which is not less than 0.4 mm and the galvanized steel sheet has a thickness (t) mm, so that an elongated hole is formed in a molten pool extending backward from a laser irradiation position at least in the steel sheet on the outer surface side, whereby welding of the two steel sheets is performed while venting metal vapor produced by the laser irradiation through the elongated hole backwards in a laser travelling direction and towards a laser irradiation source,
wherein said irradiating the laser along the one welding section is terminated at a started end portion of the one or another welded section in the direct lap region, with the conditions to form the elongated hole maintained.

* * * * *